Oct. 11, 1932. O. J. GROEHN 1,881,517
METHOD AND APPARATUS FOR FORMING BODY PANELS
Filed June 27, 1930 6 Sheets-Sheet 1

Inventor:
Otto J. Groehn.
By Macleod Calver Copeland & Dike
Attorneys

Oct. 11, 1932.    O. J. GROEHN    1,881,517
METHOD AND APPARATUS FOR FORMING BODY PANELS
Filed June 27, 1930    6 Sheets-Sheet 2

Oct. 11, 1932.   O. J. GROEHN   1,881,517
METHOD AND APPARATUS FOR FORMING BODY PANELS
Filed June 27, 1930   6 Sheets-Sheet 3

Inventor:
Otto J. Groehn
By Macleod Calm Copeland & She
Attorneys

Oct. 11, 1932. O. J. GROEHN 1,881,517
METHOD AND APPARATUS FOR FORMING BODY PANELS
Filed June 27, 1930 6 Sheets-Sheet 4

Inventor:
Otto J. Groehn
By Macleod Calm Copeland &the
Attorneys

Fig. 9
Fig. 10
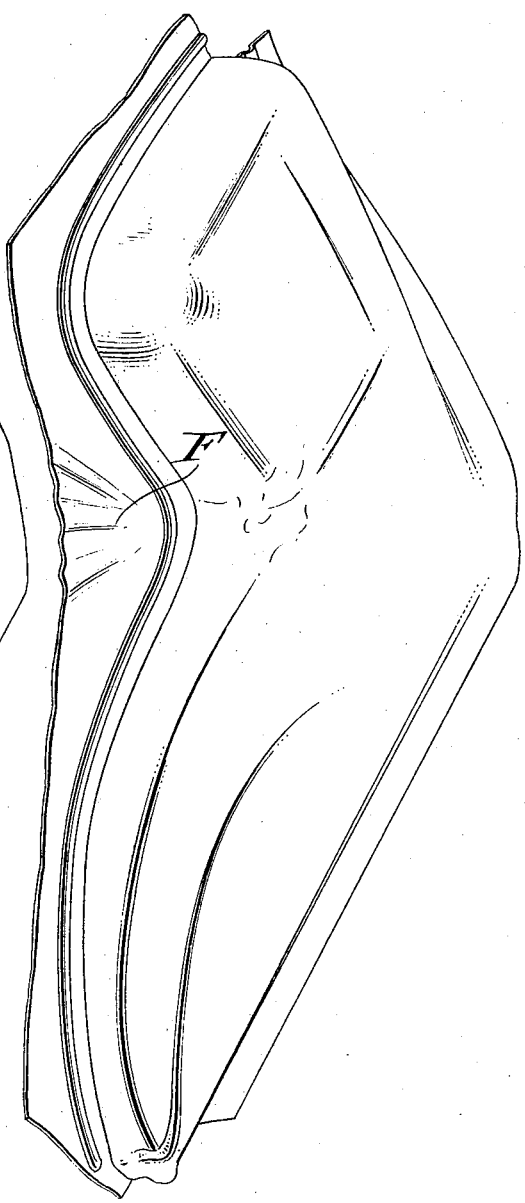

Oct. 11, 1932.　　　O. J. GROEHN　　　1,881,517
METHOD AND APPARATUS FOR FORMING BODY PANELS
Filed June 27, 1930　　　6 Sheets-Sheet 6

Inventor:
Otto J. Groehn
By Macleod Calun Copeland & Dike
Attorneys.

Patented Oct. 11, 1932

1,881,517

UNITED STATES PATENT OFFICE

OTTO J. GROEHN, OF GROSSE POINTE PARK, MICHIGAN, ASSIGNOR TO HUDSON MOTOR CAR COMPANY, OF DETROIT, MICHIGAN, A CORPORATION OF MICHIGAN

METHOD AND APPARATUS FOR FORMING BODY PANELS

Application filed June 27, 1930. Serial No. 464,272.

This invention relates to a method and apparatus for forming body panels for automobiles, the invention being particularly adapted for the purpose of producing in a single draw operation the entire rear quarter panel of a coupé body.

According to the conventional design of coupé bodies for automobiles the rear quarter panel of the body has an angular shape including an upright portion extending to the body top and a rearwardly extending portion usually provided with wheel housings, these portions being joined at the belt line of the body by a relatively abrupt reverse curve. In order to draw or stamp the rear quarter panel for such a body from a single blank of sheet steel it is necessary to draw the blank along one edge with angular sides extending inwardly on a reverse curve forming a neck. Considerable difficulty is encountered in making the draw for such a panel owing to the tendency of the metal to split or break adjacent the neck and to form wrinkles or crowsfeet which must later be bumped or hammered out in another operation, thereby resulting in considerable expense in production, not only in labor but in waste material.

In some attempts to overcome these difficulties surplus metal has been provided adjacent the neck on the theory that this was needed to prevent the blank from splitting at the neck during the course of the draw operation. As in the case where no extra metal was provided at the neck, the blank was gripped around the outside of the draw bead by means of blank holders. The surplus metal was introduced in one instance by drawing a cone or bulge transversely of the neck to give surplus metal in order to take care of the stretch of the metal around the neck during the draw operation. Neither of these methods prevented the blank from splitting or tearing within the area adjacent the reverse curve.

Upon observing the action of the metal sheet or blank at different stages in the draw operation I have discovered that two actions occurred during the course of the draw. During the first part of the draw the metal around the throat or neck starts to gather or buckle, throwing this up in a cone or bulge, this being due to forces acting toward each other and converging in the area adjacent the neck. This buckling or gathering under some conditions will continue to a depth of as much as six inches in the draw. During the latter part of the draw the metal starts to stretch around the throat or neck due to the forces acting away from each other and diverging outwardly from the neck, thus tending to stretch out the area which previously contracted or buckled. I have discovered that by relieving or freeing the metal area adjacent the neck of the reverse curve during the draw operation the blank around the margin of this neck, at the completion of the draw, will be substantially flat and a very sharp bend may be formed at this point.

An object of the invention is to overcome the difficulties heretofore encountered in drawing the rear quarter panel of a coupé body from a single blank, and to provide a method, and also an apparatus, whereby a panel of the type described may be practicably and efficiently produced in a single operation and whereby substantial savings in production may be obtained.

Other objects of this invention will appear in the following description and appended claims, reference being had to the accompanying drawings forming a part of this specification, wherein like reference characters designate corresponding parts in the several views.

Figs. 9, 10, 11 and 12 are perspective views of the panel at successive stages of the draw operation.

Before explaining in detail the present invention, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention beyond the terms of the several claims hereto appended or the requirements of the prior art.

Figure 12:
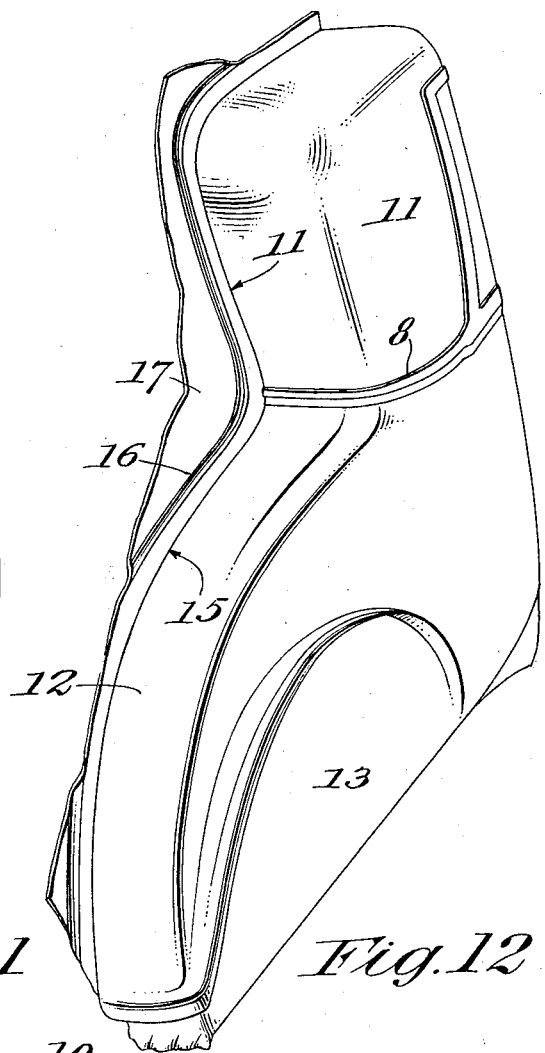
Figure 13:
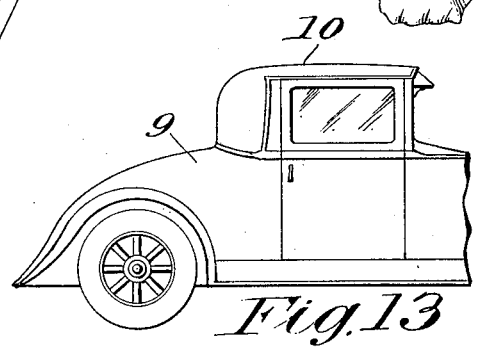
Fig. 13 is a fragmentary view of an automobile body having a panel made in accordance with the present invention.

The invention is particularly adapted for the purpose of producing from a single sheet or blank a panel such as shown in Fig. 12 which, after being suitably trimmed, forms the rear quarter panel 9 of a coupé body 10, see Fig. 13. Referring to Fig. 12, this panel when drawn is provided with an upright portion 11 forming a part of the body top and side, and a rearwardly extending portion 12 formed with a wheel housing 13. The portions 11 and 12 are drawn along lines 14 and 15 on a reverse curve at a relatively sharp angle, a draw bead 16 being pressed into the blank adjacent this curve. Within the neck at the outer side of the bead there is left an area of metal 17 which diminishes during the draw and is subject to forces heretofore tending to split or tear the metal opposite the base of the reverse curve.

Referring to Figs. 1 to 6 inclusive, the lower die of the press comprises a base or bed 18 and upright side portions 19 of suitable construction terminating in ledges 20 forming blank holding surfaces 21. The movable part of the press comprises a vertically reciprocating central die or plunger 22 and a relatively movable upper blank holder 23, the lower faces 24 of which cooperate with the blank holding faces 21 and between which the marginal portions of the blank are gripped during the draw operation. The lower blank holder is provided around its edges with draw bead grooves 25, and the upper blank holder is provided with draw beads 26 adapted to lodge in the grooves and clamp or grip the blank during the draw, allowing, however, a limited amount of slippage of the blank during the course of the draw. The upper and lower dies are shaped at 27 and 28, see Figs. 4 and 5, to form the wheel housing 13, and are also shaped at 29 and 30 to form the ornamental bead 8 in the panel.

Figure 1:
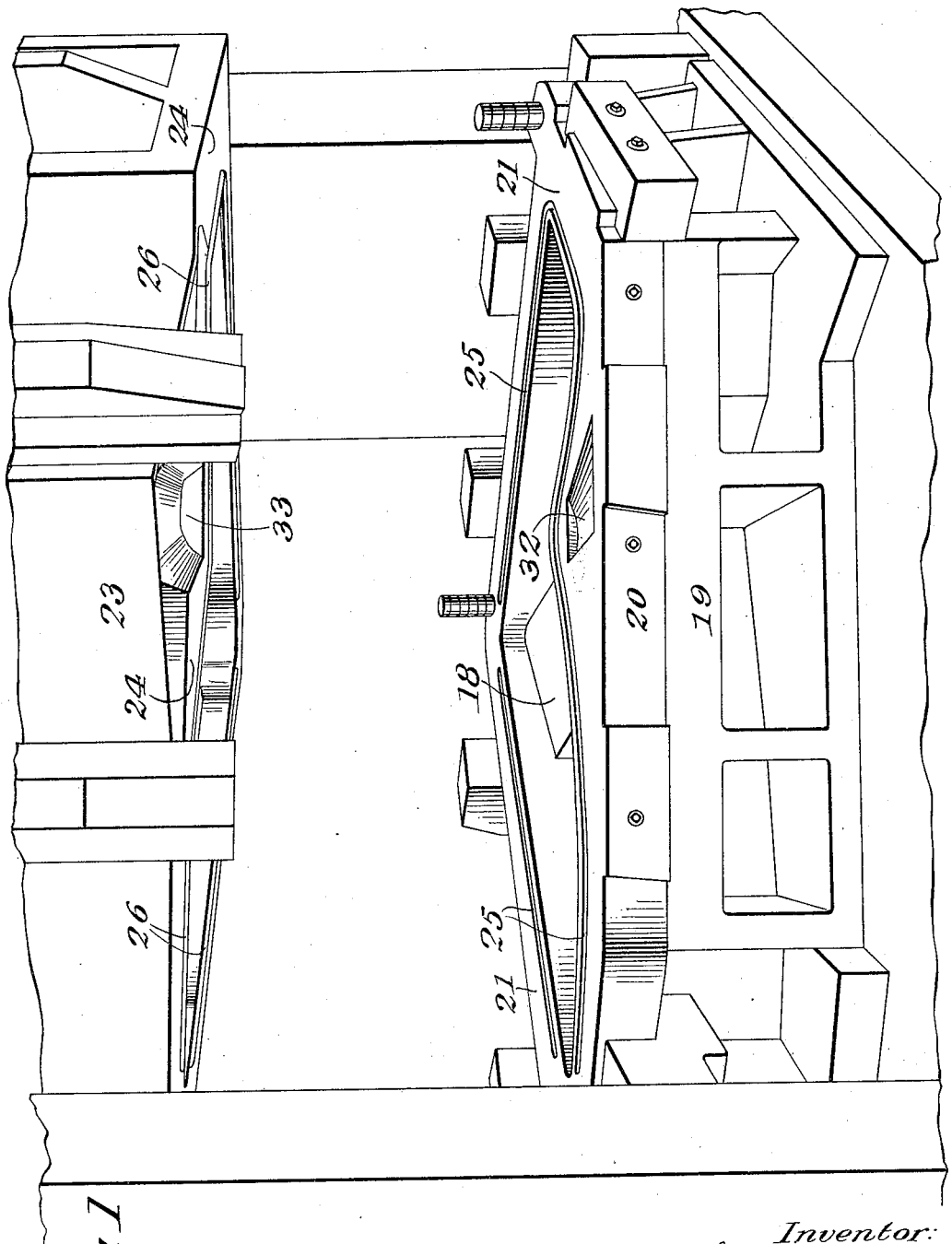
Fig. 1 is a fragmentary perspective view of a press adapted to carry out the present invention.
Figure 2:
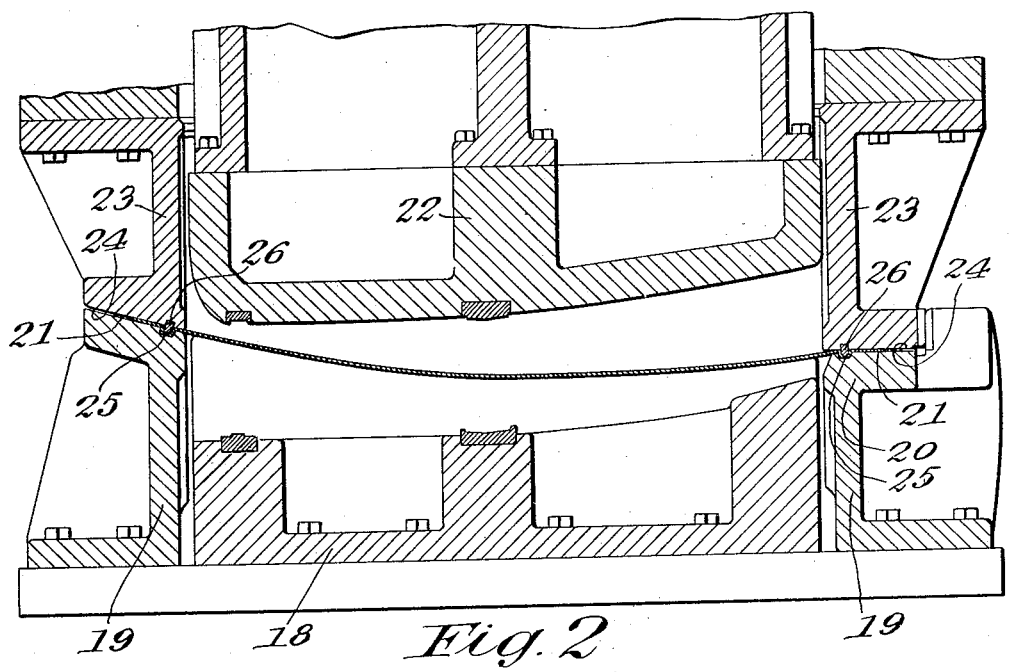
Fig. 2 is a sectional elevation taken on a line the position of which is approximately indicated by the section line 2—2 in Fig. 5.
Figure 3:
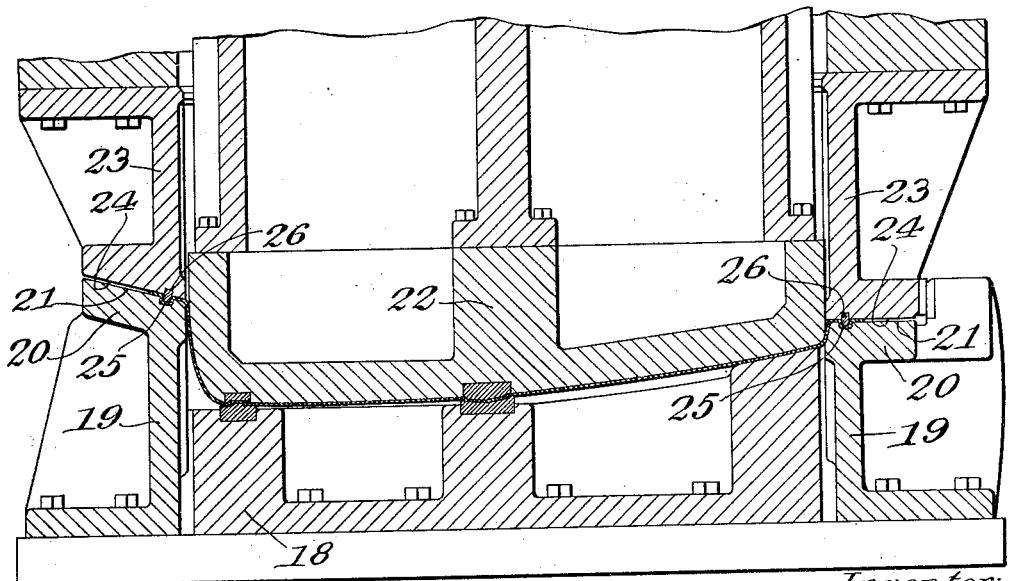
Fig. 3 is a sectional elevation similar to Fig. 2 but showing the draw die at the lower limit of its movement.
Figure 4:
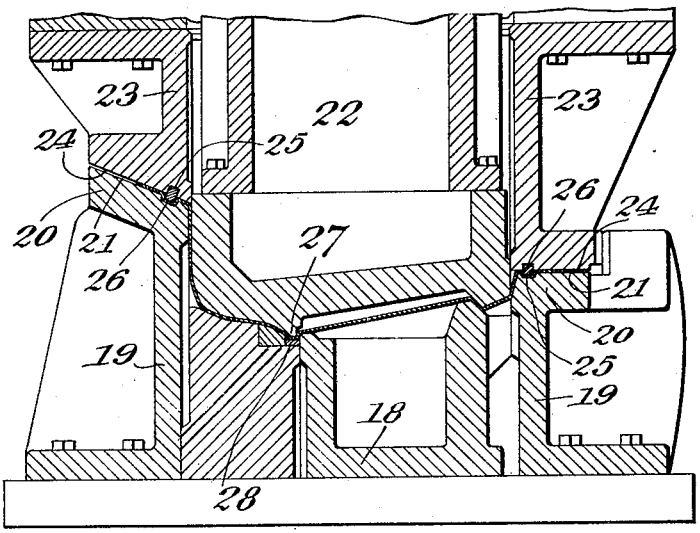
Fig. 4 is a sectional elevation taken on a line the position of which is approximately indicated by the section line 4—4 in Fig. 5.
Figure 5:
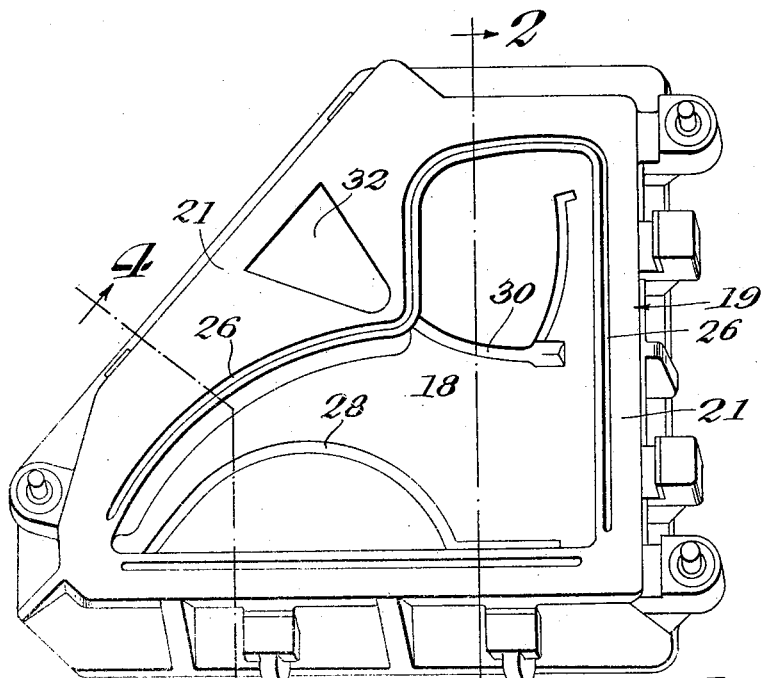
Fig. 5 is a top perspective view of the lower die and blank holder.
Figure 6:
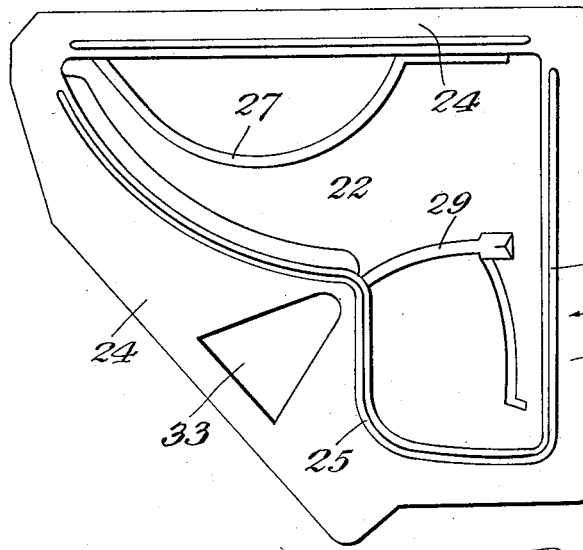
Fig. 6 is a bottom plan view of the upper die and blank holder.

The blank is first cut to the desired shape and then placed by the workman on the lower blank holder of the press. In operation the upper blank holder 23 descends first and the blank is gripped between the upper and lower blank holders. Thereupon the draw die plunger 22 descends, as shown in Fig. 2, and the drawing of the blank takes place.

Figure 7:
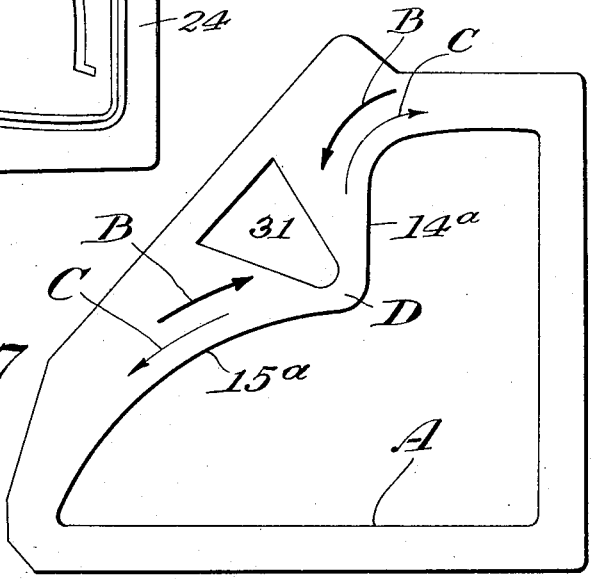
Fig. 7 is a diagrammatical view to illustrate the forces effective during the draw operation.
Figure 8:
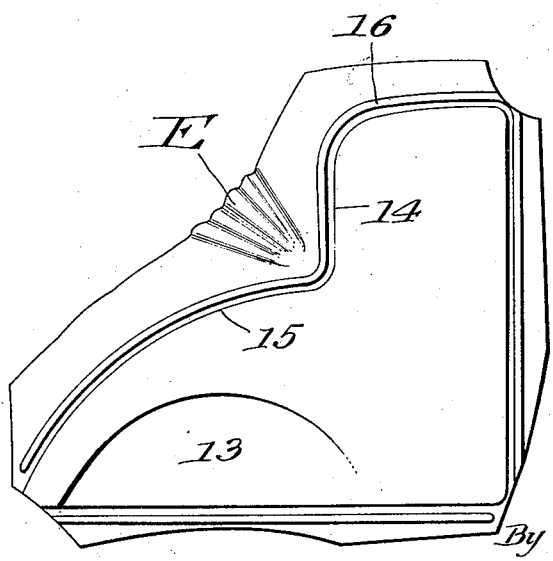
Fig. 8 is a plan view of the blank showing its condition at an early stage in the draw.

Referring to Fig. 7, the line of draw is indicated diagrammatically at A, and it will be seen that at one side this line is contracted on a reverse curve indicated at 14a and 15a to form a relatively sharp neck D. In previous attempts to draw the blank along this line it was found either that the metal in the area of the neck D split or crowsfeet or wrinkles developed, necessitating the scrapping of the panels or extra labor and expense in hammering out the wrinkles. It was thought that the splitting of the blank at the neck D was a result of insufficient metal at this point to take care of the excessive stretch during the draw and attempts were made to overcome this, without success, by introducing additional metal in this area.

I have discovered that two distinct actions occur during the draw operation. During the first part of the draw a constriction of the metal in the neighborhood of the reverse curve takes place, the metal around the neck moving in the direction of the arrows B toward the neck, resulting in the blank buckling or gathering substantially into a conical bulge shown diagrammatically by the area 31 in Fig. 7. The period of this action I have found to run during the first part of the draw, taking place in some observed instances during about the first six inches in depth of the draw. After the draw has reached this point I have discovered that stretching forces are gradually set up which act in a reverse direction and an expansion of the area 31 begins, the metal moving in the direction shown by the arrows C in Fig. 7. This action I have observed in some instances to occur from a point approximately six inches in depth of the draw to the final depth thereof. The resultant of the forces during this last stage in the operation is the stretching of the metal outwardly and away from the neck D, drawing out the conical bulge or gathers until the area of metal in the zone 31 of the neck D is substantially flat.

Figure 11:
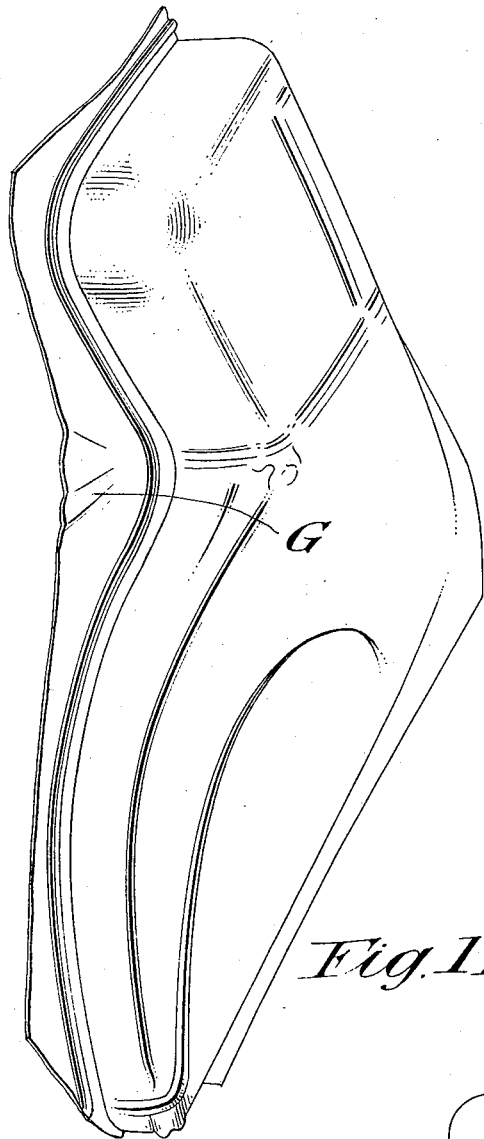

In accordance with the present invention I have found that the blank may be successfully drawn along the line A including the reverse curves 14a and 15a by providing a relief for the metal within the area of the neck D so as to leave the metal free to contract or buckle and also to stretch out during the course of the draw operation. In the present instance the lower die is provided with an outwardly flaring or conical recess 32 immediately opposite the base of the reverse curve and located in the face of the lower blank holder outside the draw bead groove 25. The upper die is also suitably provided with a corresponding conical recess 33 located opposite the recess 32 in the face of the upper blank holder. With this construction it will be seen that when the blank is gripped between the blank holders there will be formed a substantial relief space or area within the opposed recesses 32 and 33. Consequently, during the first part of the draw the blank, as shown in Fig. 9, may gather or bulge as shown at E and this excess metal is free to move into the space 32 or 33. As the depth of the draw increases accompanied by the drawing of the marginal area over the draw bead, the portion E is subjected to outward stretching forces within the recesses 32 and 33, resulting in a reduction thereof as indicated at F in Fig. 10. This action is continued as the depth of the draw proceeds, as shown at G in Fig. 11, and at the final stage of the operation the metal at the neck is fully stretched out, leaving a substantially flat area as shown at 17 in Fig. 12.

From the foregoing it will be seen that the present invention provides a method and also an apparatus whereby a single blank may be drawn, forming, for instance, the rear quarter panel of a coupé body, the blank being drawn at one side along a reverse curved, gripped around the line of the draw while at the same time a relief space is provided adjacent the neck of the reverse curve whereby the blank is free to contract and stretch during the draw operation. By virture of the invention a deep draw may be made without splitting or tearing the blank as heretofore.

I claim:

1. In an apparatus for drawing from a single blank a panel, such as the rear quarter panel of a coupé body, in combination, a lower die for supporting the blank, a draw die movable relatively thereto and having means for drawing the blank with angular sides along a reverse curve forming a neck, blank holding means for holding the blank around the line of draw, said blank holding means having a relief area opposite said neck within which movement of the blank is permitted during the draw operation.

2. In an apparatus for drawing from a single blank a panel, such as the rear quarter panel of a coupé body, in combination, a lower die for supporting the blank, a draw die movable relatively thereto and having means for drawing the blank with angular sides along a reverse curve forming a neck, blank holding means for holding the blank around the line of draw, said blank holding means having a substantially cone shaped recess opposite said neck and outside the line of draw within which the blank is free to contract during the draw operation.

3. In an apparatus for drawing from a single blank in a single operation a panel, such as the rear quarter panel of a coupé body, in combination, die mechanism including a vertically movable draw die for drawing the panel at one side on a reverse curve defining a constricted area outside the line of draw, upper and lower blank holders having means for gripping the blank around the line of draw, one of said holders having a recess in its gripping surface located at least partly within said constricted area to permit contraction and stretching of the metal in said area and movement of a portion of such metal past said gripping means into the draw.

4. In an apparatus for drawing from a single blank in a single operation a panel, such as the rear quarter panel of a coupé body, in combination, die mechanism including a vertically movable draw die for drawing the panel at one side on a reverse curve defining a constricted area outside the line of draw, upper and lower blank holders for gripping the blank around the line of draw, one of said holders having a recess in its gripping surface located at least partly within said constricted area to permit contraction and stretching of the metal in said area and movement of a portion of such metal into the draw, said recess having relatively tapered side walls converging toward the line of draw.

5. The method of drawing from a single metal blank the rear quarter panel of a coupé body, which comprises holding the blank and drawing it along a reverse curve forming a neck, relieving an area of the blank opposite said neck outside the line of draw so as to be free to contract and stretch, and gripping the blank between the line of draw and said relieved area while permitting a portion of the metal in said area to move into the draw.

In testimony whereof I affix my signature.

OTTO J. GROEHN.